United States Patent [19]
Spatafora

[11] Patent Number: 5,788,052
[45] Date of Patent: Aug. 4, 1998

[54] DEVICE FOR THE DIVISION AND ADJUSTMENT OF A PRODUCT FLOW INTO A PLURALITY OF PARTIAL PRODUCT FLOWS

[75] Inventor: Mario Spatafora, Bologna, Italy

[73] Assignee: Azionaria Costruzioni Machine Automatiche, Bologna, Italy

[21] Appl. No.: 812,836

[22] Filed: Mar. 6, 1997

[30] Foreign Application Priority Data

Mar. 6, 1996 [IT] Italy ............... BO96 A 000115

[51] Int. Cl.⁶ ............................................. B65G 47/46
[52] U.S. Cl. ....................... 198/442; 198/445; 198/367.1
[58] Field of Search ................... 198/367, 367.1, 198/436, 437, 442, 444, 445, 633, 634, 637, 598

[56] References Cited

U.S. PATENT DOCUMENTS

| | | | |
|---|---|---|---|
| 1,685,335 | 9/1928 | Paterson et al. | 198/445 |
| 1,839,327 | 1/1932 | Mayo | 198/445 |
| 3,343,689 | 9/1967 | Fehely | 198/633 X |
| 4,108,301 | 8/1978 | Trozzi | 198/637 X |
| 4,880,104 | 11/1989 | Evans et al. | 198/445 |

FOREIGN PATENT DOCUMENTS 2161618  6/1973  Germany .

*Primary Examiner*—James R. Bidwell
*Attorney, Agent, or Firm*—IP Group of Pillsbury Madison & Sutro LLP

[57] ABSTRACT

Device for the division and adjustment of a flow of products into a plurality of partial flows, which are fed to a plurality of working machines by a belt conveyor, in which distributing units are provided with blades for the interception of the products. The blades being moved along respective support structures by corresponding cursors to which the same blades are rotatingly connected.

12 Claims, 4 Drawing Sheets

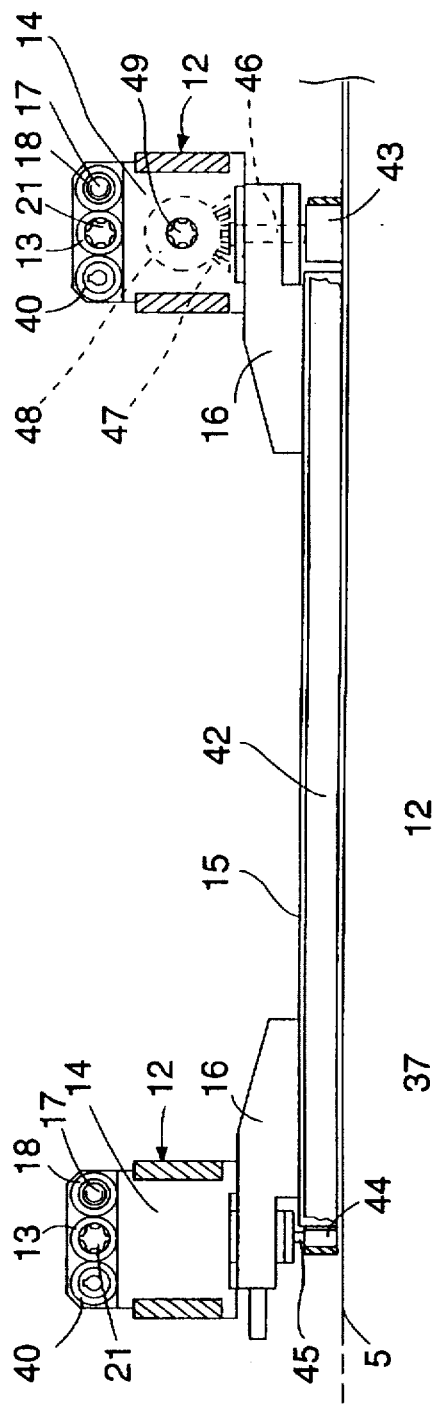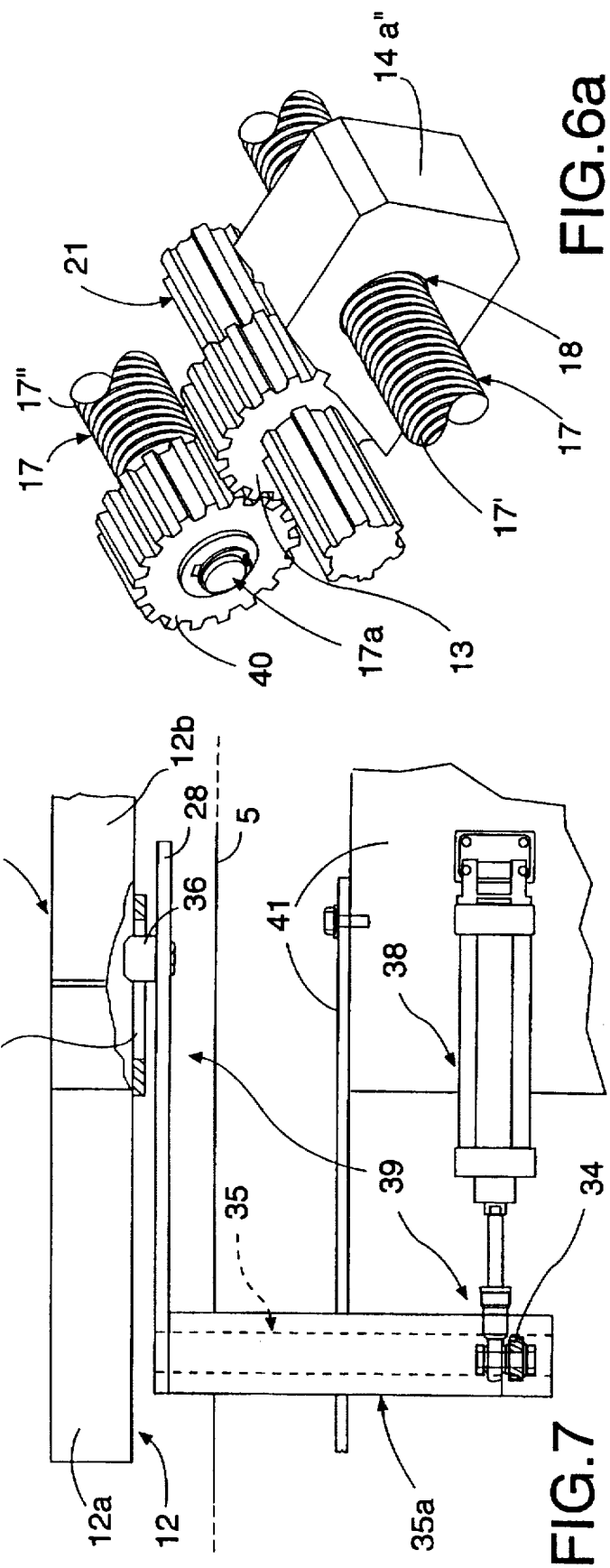

5,788,052

DEVICE FOR THE DIVISION AND ADJUSTMENT OF A PRODUCT FLOW INTO A PLURALITY OF PARTIAL PRODUCT FLOWS

BACKGROUND OF THE INVENTION

The present invention relates to a device for the division and adjustment of a product flow into a plurality of partial product flows.

The present invention can be advantageously applied to the food industry and, in particular, to the field of food product packaging, such as chocolate candies and the like, to which the following description will refer, while still maintaining its specificity.

In general, the chocolate candies are randomly distributed onto a belt conveyor directly from a moulding machine which produces the chocolate candies or said chocolate candies are withdrawn from cold storage and are randomly arranged on the same belt conveyor. In turn, the belt conveyor feeds a plurality of working machines, such as wrapping machines, positioned downstream from the belt conveyor. Therefore, in reality, a product flow is created along the belt conveyor which is made to advance towards a feeding area, in proximity of which the same flow is divided into partial flows, singularly directed towards their respective working machines.

The division of the product flow into partial product flows, and their subsequent deviations, are obtained by means of distributing units which operate in the feeding area of the conveyor. Said distributing units are essentially provided with blades that are substantially parallel to each other and supported in a revolving manner at their opposite ends by respective cursors. The cursors are supported by respective support structures along which said cursors may be manually moved and positioned each time it is necessary. The distributing units are coupled to the conveyor and support the blades, which are substantially positioned "on edge" along the unwinding direction of the belt, and therefore, along the feeding direction of the products, in order to intercept the product, and ultimately, and conveniently, deviate said products from their advancing direction.

In actual practice, the total product flow and the partial product flows are obviously dependent on each other so that, if for any reason (for example, machine failure) one or more of the single wrapping machines is not able to receive the product flow intended for said machine, the remaining machines should receive product flows characterised by a greater amount of products.

In such a hypothetical, yet inconvenient situation, the reorganisation of the distributing units is necessary. This consists in the operation of appropriately torquing the angle of the blades in relation to the advancing direction of the products, in such a way as to deviate the partial product flows towards the machines in operation, and also consists in changing the reciprocal distance of the blades along a direction which is substantially transversal to the belt, so as to be able to subdivide the product flow into partial product flows with a greater amount of products. The opposite situation, once again, occurs when the machine, which had been previously excluded from the feeding process, resumes its working condition.

The above mentioned known method of adjustment presents several drawbacks, mainly due to the fact that said method is put into practice in a completely manual and cut-and-try way, until a redistribution of the partial product flows is attained, in relation to the conveyor, consistent with the number and the location of the working machines in operation.

The above mentioned known method, therefore, leads to frequent interruptions, and subsequently long set-up times for the distributing unit, each time an arrest, or even an operative cut-out of some working machine, or again, just one variation in the production of products systematically receivable from one or more working machines, is determined.

The object of the present invention is to provide a device for the division and adjustment of a product flow, such as chocolate candies and the like, into a plurality of partial product flows, in which there is no hint of the drawbacks described above.

SUMMARY OF THE INVENTION

The stated object is realized in a device for the division and adjustment of a product flow into a plurality of partial product flows which are fed to a plurality of working machines by a belt conveyor, said device comprising at least one product distributing unit provided with blades, with cursors, to which the blades are rotatingly interconnected at their own opposite ends, and with structures along which the cursors are slidingly mounted, supporting the blades which are positioned "on edge" towards the conveyor, to intercept the product flow, along an advancing line, and to subdivide the same flow into partial product flows which are deviated towards the working machines, said device being characterised in that it comprises moving means, kinematically connected to the blades and to the structures, for torquing the angle in relation to the advancing line and to the reciprocal distance of the blades, detection means for detecting the angular torque of the blades and the operative state of the working machines, as well as control means for automatically activating the angular torques of the blades, in relation to the signals of said detection means, consequently redistributing the partial product flows.

BRIEF DESCRIPTION OF THE DRAWINGS

The invention will now be described in detail, by way of example, with the aid of the accompanying drawings, in which:

FIG. 6 is a schematic view of section VI—VI of FIG. 5, with some parts removed;

FIG. 6a is a schematic perspective view of a detail of FIG. 6; and

FIG. 7 is a schematic view A of FIG. 5, with some parts removed.

DESCRIPTION OF THE PREFERRED EMBODIMENTS

Figure 1:
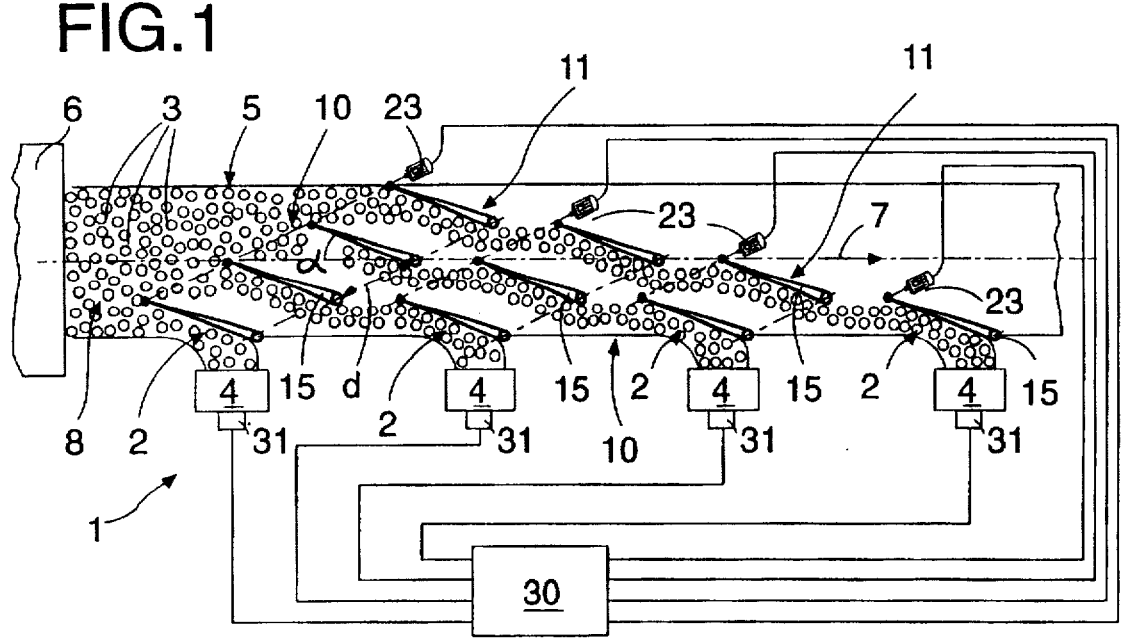
FIG. 1 is a schematic plan view, with some parts removed, of the device in a first operative condition, according to the present invention.
Figure 2:
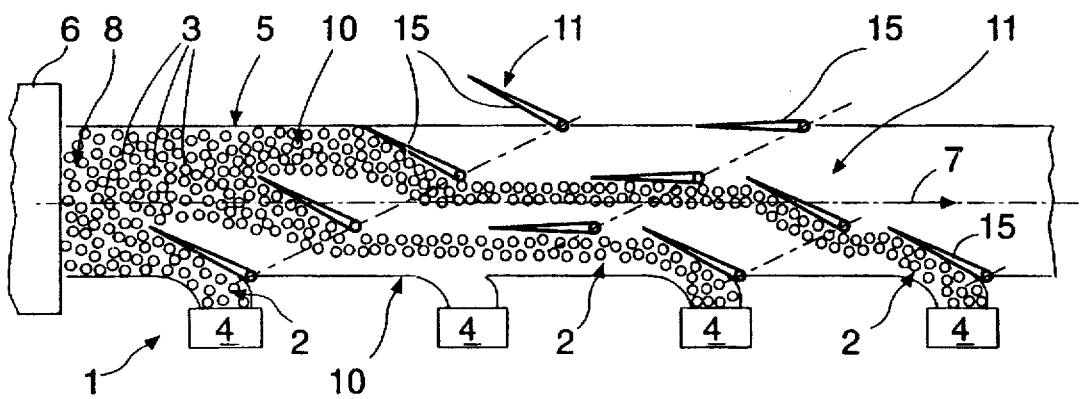
FIGS. 2 and 3 respectively are views of the device in FIG. 1 in two operative conditions, different from the condition in FIG. 1.
Figure 3:
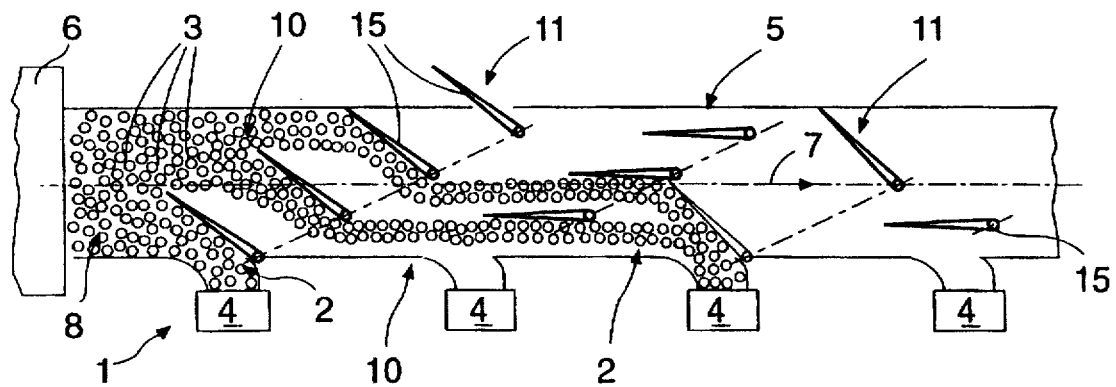

With reference to FIG. 1 of the accompanying drawings, 1 denotes, in its entirety, a device for the division and adjustment of a flow 9 of products 3, in this particular case, chocolate candies and the like, into a plurality of partial product flows 27 which is coupled to a conveyor 5 positioned at the exit end of a moulding machine 6 (FIGS. 1, 2 and 3) for chocolate candies 3.

The conveyor 5 is a belt conveyor which extends from the exit end of the moulding machine 6 and carries the flow 8 of products 3 towards a plurality of wrapping machines 4. More precisely, the flow 9 advances towards one or more so called areas 10 of distribution, unilateral, in relation to the belt conveyor 5, maintaining an appropriate speed along a substantially rectilinear advancing line 7.

In the area or areas 10 of distribution, product 3 distributing units 11 are envisaged, which sequentially succeed along an advancing line 7, and to which number usually corresponds to the number of wrapping machines 4.

Figure 4:
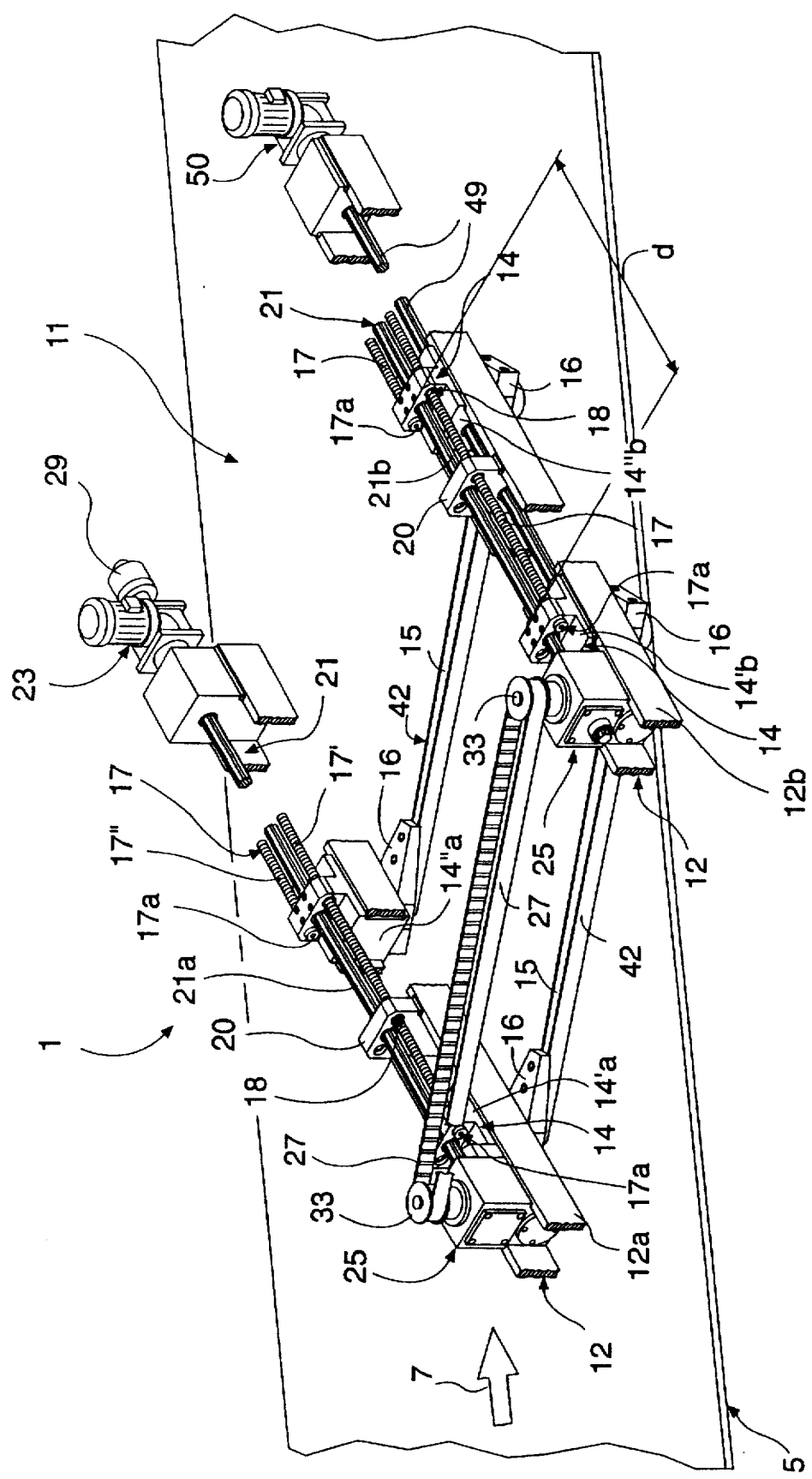
FIG. 4 is an enlarged schematic perspective view, with some parts removed, of a preferred embodiment of the device in FIG. 1.
Figure 5:
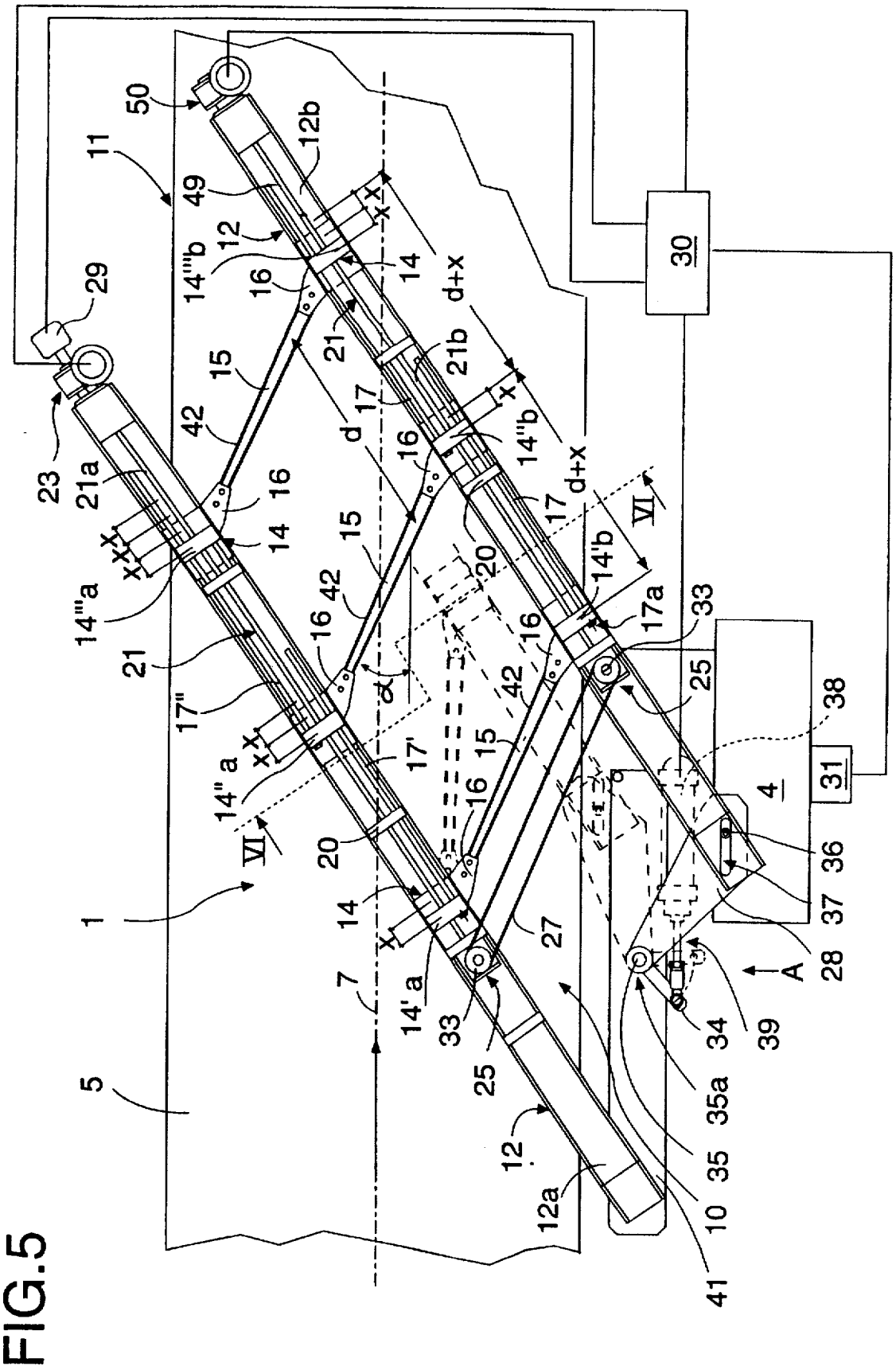
FIG. 5 is a schematic plan view of the device in FIG. 4.

As illustrated in FIGS. 4 and 5, each distributing unit 11 comprises a plurality of blades 15 which, in their rest position, keep their own axes substantially longitudinally in relation to the advancing direction of the chocolate candies 3, and said blades are substantially parallel to each other. The blades 15 are rotatingly connected at their opposite ends 16, to corresponding cursors 14, two for each blade 15, each of which is supported by a respective guiding structure 12 along which each cursor 14 is slidingly independently.

The guiding structures 12, therefore, are positioned substantially transversely, in relation to the belt conveyor 5, slanted, in relation to the advancing line 7 of the products 3, and substantially parallel to each other.

Furthermore, the guiding structures 12, which for better clarity, are respectively denoted by 12a and 12b, are substantially transversal to the blades 15, which are supported by the cursors 14, so as to be turned towards the underlying belt conveyor 5 and positioned "on edge". In their working condition, the blades 15 are positioned in a certain "alpha" angular torque, in relation to the advancing line 7 and to a certain reciprocal distance "d", in order to be able to intercept the flow 9 of products 3, which advances along the conveyor 5, subdividing said flow into a plurality of partial product flows 2 which are deviated and distributed to the working machine 4.

The device 1, as hereunder better described, comprises moving means, denoted by 17, 18, 20, 21, 23 and 39, which are shaped to interact with the blades 15 and with the guiding structures 12, so as to be able to torque the "alpha" angle, in relation to the advancing line 7 and to the reciprocal distance "d" of the blades 15.

Furthermore, the device 1 comprises both, detection means 29 and 31, intended to respectively detect the instantaneous "alpha" angular torque of the blades 15 and of the operative state of the working machines 4, as well as conventional automatic control means, which are schematically represented in the form of a unit 30 and which serve to activate the "alpha" angular torque of the blades 15 in relation to the signals received by the detection means 29 and 31, consequently redistributing the partial flows 2 of the products 3.

As illustrated in FIGS. 4, 5, 6, and 6a, the above mentioned moving means of the blades 15 comprise a series of mechanisms which, among other things, include, threaded rods 17 and corresponding internal nut screws 18 which are reciprocally coupled. The threaded rods 17 operate between pairs of consecutive cursors 14 positioned along each guiding structure 12 so as to connect all the cursors 14 of a same structure 12, in succession, between each other. In particular, for a generic pair of consecutive cursors 14, which can be generically defined as "preceding cursor" and "contiguous cursor", for example, the cursors in FIGS. 4 and 5 related to the structure 12a and denoted by 14'a and 14"a, the corresponding threaded rod 17, which for better clarity is denoted by 17', is connected to the cursor 14'a by means of a gear 40 splined to the end 17'a of the same threaded rod 17'. In this manner, said threaded rod 17' is axially blocked with respect to the cursor 14'a.

Furthermore, said threaded rod 17' is coupled to an internal nut screw 18 positioned on the cursor 14"a. Connected to the end 17a of said cursor 14"a, which is adjacent to cursor 14'a, is a second threaded rod 17, denoted by 17" which, as in the previous case, is axially blocked in relation to said cursor (see FIG. 6a related to the cursor 14"a). In addition, the same threaded rod 17" is coupled to the internal nut screw 18 of a third cursor 14"'a, consecutively positioned in relation to the first two cursors.

As clearly presented in the following description, in some specific cases, the threading of a generic threaded rod 17 may have several right threaded sections and other left threaded sections, such as two successive threaded rods 17 may have different threadings, one right and one left, or vice versa. As it progresses, the above described situation repeats itself for all the cursors 14 of a same structure 12.

In the embodiment of the device 1 illustrated in FIG. 5, three cursors are represented, yet in relation to specific needs, the number of said cursors may be more or less than three.

Furthermore, for each distributing unit 11, the above mentioned moving means comprise two drive shafts 21, respectively denoted by 21a and 21b, each functioning along a related structure, 12a and 12b, respectively. The driving motors 21 are spline shafts which engage to corresponding grooves formed in a toothed hub 13 positioned on each cursor 14 so as to allow for an axial sliding movement of the hub 13 on the shaft 21 and, consequently, of the cursor which supports said shaft. More precisely, the hub 13 is positioned between the internal nut screw 18 and the previously mentioned gear wheel 40 to which said hub is kinematically coupled. Therefore, a rotation of the shaft 21 corresponds to a rotation of the hub 13, transmitting the movement to the gear wheel 40 which, in turn, sets the corresponding threaded rod 17 into rotation.

As a consequence of the aforementioned description, all the cursors 14 of a same structure 12 are kinematically connected to each other.

Usually, the structures 12 are equipped with one or more reference supports 20, intended to liberally support both the corresponding shaft 21, and the related threaded rods 17. If all the cursors 14 liberally move along a same structure 12, for example, cursors 14 of structure 12a, said structure 12 is equipped with a fixed reference support 20 which, in turn, is equipped with a respective internal nut screw 18 onto which the corresponding threaded rod 17' can be screwed. In this case, the threaded rod 17' has its own section, which extends from the cursor 14'a to the reference support 20 which has a right threading, while the section which extends from the locating support 20 to the successive cursor 14"a has a left threading. Therefore, if the shaft 21a is set into rotation, the hub 13 of the cursor 14'a, by means of the corresponding gear wheel 40, sets into rotation the threaded rod 17', which is screwed onto the internal nut screw 18 of the support 20, and advances, causing all the cursors 14, connected in succession to each other, of the structure 12a, to advance by a measure of length X. All the cursors 14, therefore, assume a global rigid shift, which in the description that follows of the present invention, will be referred to as a "received translation". Furthermore, during its advancement and simultaneous rotation, the threaded rod 17', by means of its left threaded section, is coupled with the internal nut screw 18 of the cursor 14"a, therefore, simultaneously advancing by another measure of length X. This further translation, which in the description that follows of the present invention, will be referred to as "proper translation", is summed to the translation received from the cursor 14'a, therefore, the cursor 14"a advances along the structure 12a by a measure of length equal to 2*X.

Simultaneously, the cursor 14'"a receives a translation of length equal to 2*X from the cursor which precedes said cursor 14'"a, by means of the threaded rod 17" which, in turn, being set into rotation by the corresponding pinion gear 13 FIG. 6a and having left threading, pushes the cursor 14'"a by a proper translation of length, equal to X which, therefore, moves by a measure of length equal to 3*X.

In the embodiment of the invention illustrated in FIGS. 4 and 5, the two driving shafts 21 receive movement from a single gear motor, which acts directly on the shaft 21a, positioned along the corresponding structure 12a.

To allow for the driving shaft 21b, which is positioned on the other structure 12b, to also be set into a simultaneous rotation, reciprocal mechanical connecting means 25, 27 are envisaged which, in the embodiment illustrated in FIGS. 4 and 5, are composed of a pair of angular driving gears 25 firmly supported by the corresponding structures 12. Each driving gear 25 is kinematically connected to one of the ends of the driving shaft 21, and the driving gears 25 are each respectively equipped with a gear wheel 33, each of which is kinematically connected, by means of the related driving gear 25, to the corresponding driving shaft 21. The two wheels 33 are kinematically connected to each other by a positive drive belt 27, guaranteeing for a continuity of motion between the driving gears 25. If all the cursors (14) are liberally mobile along their respective structures 12, with the exception of one cursor, denoted by 14'b in FIGS. 4 and 5, which is instead fixed to its respective structure 12b by the driving gear 25, it is possible to vectorially combine the above-mentioned received and proper translations of the various cursors 14 which compose the corresponding distributing unit 11. This allows to determine the "alpha" angular torque of the blades 15 and the transversal movement on the belt conveyor 5 of said blades 15, in a condition of constant reciprocal parallelism, and to determine the variation in the mutual distances "d" of said blades 15, in order to increase or decrease said distances, and, therefore when necessary, to increase or decrease the quantity of products 3 receivable during the unit of time between the blades 15. In fact, if the spline shafts 21 are set into rotation by means of the gear motor 23 and the driving gears 25 with the corresponding positive drive belt 27, the cursors (14) of a same structure (12), due to the above mentioned kinematic characteristics, simultaneously translate by increasing measures of length from one cursor 14 to the successive cursor. As described above, such translations, which usually proceed from cursor 14 to cursor 14, are multiples of a movement of length (X), corresponding to the lateral shift of the first mobile cursor 14 of the kinematic chain. The cursors 14 of the other generic structure 12 assume an analogous behavior.

Instead, if the case illustrated in FIG. 5 is taken into consideration, in which the structure 12b envisages its own cursor 14'b to be fixed with respect to the other cursors, then lateral shifts, which are still multiples of a sample measure of length X, occur for the other two cursors, 14"b and 14'"b.

However, said shifts are staggered, in relation to the shifts of the cursors 14 of the other structure 12a, by a measure of length X corresponding to the missing shift of the fixed cursor 14'b. Consequently, from the composition of the movements of translation, which involve the dragging movement of the cursors 14 and of the proper motions of each of said cursors, the opposite ends 16 of a same blade 15 receive resulting lateral shifts, which differ from each other by a measure of length X. Although obtained as a difference of different shifts from one blade 15 to another, said measure of length is constant for every successive blade 15. Therefore, said different shifts produce "alpha" angular torques of the blades 15 correlated to the lateral shift X, as well as a certain variation of their reciprocal distance "d", substantially equal to the above mentioned measure of length X.

More specifically, when referring to the structure 12b in which at least the cursor 14'b is fixed, the proper translation of the cursor 14"b occurs, since the first threaded rod 17, using the driving gear 25 as a reference, presents its left threading which, when coupled with the inner nut screw formed in the cursor 14"b, allows for an advancement of said cursor equal to X.

The cursor 14"b, in turn, by means of the second threaded rod 17, also causes the following cursor 14'"b to advance which, therefore, advances due to a received translation by an equal measure X.

Simultaneously, the second threaded rod 17 is set into rotation in the opposite direction of the first rod by the driving shaft 21b. The coupling of the second threaded rod 17 with the internal nut screw 19 of the cursor (14'"b) allows the latter its own simultaneous advancement by X which is then summed to the received advancement.

Therefore, the cursor 14'"b advances by X plus X. As illustrated in FIGS. 5 and 7, the structures 12 are necessarily mobile in a reciprocal approaching and withdrawing direction, moving parallel to each other according to the "alpha" angular torques of the blades 15. For this purpose, the above mentioned moving means also comprise a crank gear 39 which is provided with a lever 34 that is firmly connected to a plate 28 by means of a vertical pin 35. Said pin 35 can freely rotate inside a tube 35a which is firmly fixed to a supporting frame 41. The lever 34 is connected to a piston 38 with its end opposite to the end connected to the pin 35. Under the action of said piston, an angular movement of the plate 28 corresponds to an angular movement of the lever 34.

The plate 28 is jointed with its own pin 36 onto a slot 37 formed on one of the structures 12, precisely on structure 12b, at an end of said plate opposite to the end which is engaged by the lever 34, so that the structure 12b is mobile, in relation to the structure 12a, under the action of the piston 38. In particular, the structure 12b is moved, in a parallel manner to itself, in both an approaching direction and in a withdrawing direction, in relation to the other structure 12, so as to rotate the blades 15 between a generic alpha slanting position, with respect to the advancing line 7 of the flow 8 of products 3.

The positions which the blades 15 assume, following said movement, vary from one condition of interception of the products 3, with the blades slanted by alpha and substantially parallel to the advancing line 7 (partially outlined in FIG. 5), to a corresponding condition of non-interception of the products 3.

As represented in FIGS. 5 arid 6, a band 42 is arranged around the perimeter of each blade 15. Said band 42 is looped around a first pulley 43 and a second pulley 44. Said pulleys 43 and 44 are positioned at the opposite ends of each blade 15 and are rotatingly supported by their respective pins 46 and 45. In particular, the pin 46 is connected to a vertical bevel gear 47 which is coupled to a second horizontal bevel gear 49.

The horizontal bevel gear 48 axially presents grooves onto which a spline shaft 49 is engaged. Said spline shaft 49 is splined onto a gear motor 50 (FIGS. 4 and 5) from which the shaft receives its rotating motion. By setting the spline shaft 49 into rotation, the pin 46 is set into rotation which, by means of the first pulley 46, moves the band 42 around the perimeter of the blade 15. The moving band 42 directs the chocolate candies 3 which hit against the blade 15 during the interception of the flow 9.

Splined to one of the two spline shafts 21, precisely 21a, is a multi-revolution encoder 29 which, after an initial setting, and as an actuating component of the detection means, detects the angular rotation of the spline shaft 21 and, moment-by-moment, refers said rotation to the "alpha" angular torque of the blades 15 with respect to the advancing line 7.

Other actuating components of the detection means are also represented by conventional sensors 31 of the operative state of the machine 4 served by the device 1, schematically represented in FIGS. 1, 2, 3, and 5.

Therefore, in actual practice, the detection means 29 and 31 send signals to the control means 30, said signals being correlated to the degree of receptivity of the products 3 by the working machine 4, permitting to automatically modulate the "alpha" angular torque of the blades 15 in a continuous manner, thus redistributing the partial flows 2 between the various working machines 4, with the possibility of not intercepting the partial flow 2 if the machine 4 stops running. The control means 30 also provide for activating the gear motor 50 which sets the spline shaft 49 into rotation.

What is claimed:

1. A device for the division and adjustment of a flow of products into a plurality of partial flows, which are fed to a plurality of working machines by a belt conveyor, said device comprising at least one distributing unit of the products provided with blades, with cursors, to which the blades are rotatingly interconnected at their own opposite ends, structures along which the cursors are slidingly mounted, supporting the blades which are positioned "on edge" towards the conveyor to intercept the flow, along an advancing line, and to subdivide the same flow into partial flows which are deviated towards the working machines, wherein provision is made for moving means, kinematically connected to the blades and to the structures, for torquing the angle in relation to the advancing line and to the reciprocal distance of the blades, detection means for detecting the angular torque of the blades and the operative state of the working machines, as well as control means for automatically activating the angular torque of the blades, in relation to the signals of said detection means, thus redistributing the partial flows of the products.

2. A device as in claim 1, wherein said moving means comprise, for each pair of cursors consecutively positioned on said structure and respectively defined as preceding and contiguous cursor, at least one reciprocally coupled threaded rod internal nut screw mechanism, said threaded rod, which mechanically connects said pair of cursors, being set into rotation upon the activation-oil of related drive means and intended to be coupled to corresponding internal nut screws positioned on fixed reference support and on said contiguous cursor, so as to respectively impart a global rigid shift to said pair of cursors and a proper shift of the contiguous cursor, which is summed to the global rigid shift.

3. A device as in claim 2, wherein the threaded rod, which connects said pair of cursors, has a first and second section of different threading, said first section intended to be coupled with said fixed reference support, in order to generate said global rigid shift, the second section intended to be coupled with the internal nut screw formed in the contiguous cursor, in order to generate said proper shift of the latter.

4. A device as in claim 2, wherein, for each distributing unit, there is at least one cursor fixed on one of said structures, so that, in actual practice, said moving means determine proper and received shifts which are concordant, simultaneous and of the same measure as the mobile cursors and as the corresponding ends of the blades, said shifts occurring on the opposite ends of a same blade so as to differ from each other by a constant measure for all the blades, in order to produce corresponding angular torques of said blades, and produce a variation in their reciprocal distance, correlated to the measure of the shift of said cursors.

5. A device as in claim 2, wherein said driving means comprise, for each structure, at least one drive shaft, kinematically connected to each threaded rod, said drive shafts being driven by one single motor.

6. A device as in claim 5, wherein said drive shafts have their own splined profile which engages into corresponding toothed hub, positioned on each cursor, so as to allow for a sliding movement of said cursor on each shaft, each hub being coupled to a corresponding gear wheels splined to each end of each threaded rod.

7. A device as in claim 2, wherein said moving means comprise kinematic connecting means of shafts, respectively supported by said structures.

8. A device as in claim 7, wherein said kinematic connecting means comprise angular driving gears, associated to said shafts, connected to a ring flexible element for a reciprocal transmission of motion.

9. A device as in claim 1, wherein said moving means comprise, for each distributing unit, a crank gear, associated to one of said structures, for determining a movement of said structure, parallel to itself, in both an approaching and a withdrawing direction, in relation to the other structure, so as to rotate the blades between a generic alpha slanting position, in relation to the advancing line of the flow of products, to which corresponds a condition of interception of said products performed by the blades, and a position substantially parallel to the advancing line to which corresponds a condition of non-interception of said products, said crank gear being controlled by said control means.

10. A device as in claim 1, wherein said detection means comprise at least one encoder associated to moving means for detecting the operative conditions of said means, which can be related to the angular torque (alpha) of the blades, and a detector of the operative condition of each working machine; said encoder and detector being connected from their outputs to said control means.

11. A device as in any of the preceding claims, wherein, along the perimeter of each blade, a band is arranged, linked around a first pulley and a second pulley, positioned at the opposite ends of each blade, and rotatingly supported by their respective pins; provision is made for driving means shaped so as to move said band around said pulley.

12. A device as in claim 11, wherein said driving means are composed of a gear motor which moves a drive shaft which is grooved and splined to respective bevel gears connected to said pin.

* * * * *